(12) United States Patent
Herget

(10) Patent No.: US 9,047,890 B1
(45) Date of Patent: Jun. 2, 2015

(54) INDUCTOR WITH NON-UNIFORM LAMINATION THICKNESSES

(71) Applicant: International Business Machines Corporation, Armonk, NY (US)

(72) Inventor: Philipp Herget, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/143,662

(22) Filed: Dec. 30, 2013

(51) Int. Cl.
*G11B 5/39* (2006.01)
(52) U.S. Cl.
CPC ........................................ *G11B 5/39* (2013.01)
(58) Field of Classification Search
USPC .................................................... 360/123.06
See application file for complete search history.

(56) References Cited

U.S. PATENT DOCUMENTS

| | | | |
|---|---|---|---|
| 6,346,336 B1 | 2/2002 | Nago | |
| 6,490,128 B1 * | 12/2002 | Sato | 360/125.68 |
| 6,970,323 B2 * | 11/2005 | Kamijima | 360/123.39 |
| 7,365,943 B2 * | 4/2008 | Yamakawa et al. | 360/125.33 |
| 7,428,776 B2 * | 9/2008 | Inaguma | 29/603.24 |
| 7,457,080 B2 * | 11/2008 | Watabe et al. | 360/125.12 |
| 7,560,931 B2 | 7/2009 | Nabetani | |
| 7,791,836 B2 * | 9/2010 | Masai | 360/123.01 |
| 7,791,837 B2 * | 9/2010 | Fujiwara | 360/123.41 |
| 8,159,044 B1 | 4/2012 | Chen et al. | |
| 8,164,853 B2 * | 4/2012 | Hirata et al. | 360/125.3 |
| 8,233,237 B2 * | 7/2012 | Anagawa et al. | 360/125.3 |
| 2009/0051474 A1 | 2/2009 | Lee et al. | |
| 2010/0060397 A1 | 3/2010 | Raiser et al. | |
| 2012/0280781 A1 | 11/2012 | Smeys et al. | |

FOREIGN PATENT DOCUMENTS

| | | |
|---|---|---|
| JP | 08130117 A | 5/1996 |
| JP | 2000114041 A | 4/2000 |
| JP | 2012009795 A | 1/2012 |
| JP | 2012169407 A | 9/2012 |

OTHER PUBLICATIONS

Grandi et al., "Model of Laminated Iron-Core Inductors for High Frequencies", IEEE Transactions on Magnetics, vol. 40, No. 4, Jul. 2004, pp. 1839-1845, Digital Object Identifier 10.1109/TMAG. 2004.830508, Copyright 2004 IEEE.
Shah, "Development of Mems Power Inductors with Submicron Laminations Using an Automated Electroplating System", A Thesis Presented to the Academic Faculty, Georgia Institute of Technology, Dec. 2007.

* cited by examiner

*Primary Examiner* — Mark Blouin
(74) *Attorney, Agent, or Firm* — David Woycechowsky; William H. Hartwell

(57) ABSTRACT

A thin film inductor having yokes, one or more of which is laminated, and one or more conductors passing between the yokes. The laminated yoke or yokes help reduce eddy currents and/or hysteresis losses. Magnetic layers of the laminated yoke have varying thickness, with the thickness of magnetic layers closer to the winding (that is, in areas of higher density magnetic flux) having relatively lower thickness(es) in order to further reduce eddy currents and related energy losses.

12 Claims, 3 Drawing Sheets

INDUCTOR WITH NON-UNIFORM LAMINATION THICKNESSES

BACKGROUND OF THE INVENTION

The present invention relates generally to the field of thin film inductors (see definition of "thin film inductor," below) and more particularly to thin film inductors with laminated pole pieces (or "yoke pieces") that are in the form of a stack of relatively thin layers alternating between magnetic material layers and insulating material layers.

The integration of inductive power converters onto silicon is one path to reducing the cost, weight, and size of electronic devices. One main challenge to developing a fully integrated power converter is the development of high quality thin film inductors. Thin film inductors for power conversion applications should store a large amount of energy per unit area to fit in the limited space on silicon. To accomplish this, ferromagnetic materials are used to increase the energy stored for a given current. However, ferromagnetic materials also introduce some disadvantages. Magnetic materials operating at high frequency produce losses through eddy currents and hysteresis. The eddy currents are created when the time varying magnetic fields in the yokes create an electric field that drives a circular current flow. These losses can be substantial and increase with the thickness of the yoke, and driving frequency of the inductor. Hysteresis losses can be created by magnetic domain walls in the yoke material. To enable efficient power conversion it is therefore critical to reduce the eddy current and hysteresis losses in the yokes.

SUMMARY

According to an aspect of the present invention, a thin film inductor includes: (i) a current carrier portion; (ii) a yoke portion; and (iii) a set of electrically insulating layer(s) including at least a first insulating layer. The yoke portion is one of the following types: a top yoke portion or a bottom yoke portion, with the yoke portion including a current-carrier-facing surface. The yoke portion includes: multiple of magnetic layers, including a first magnetic layer and a second magnetic layer, with each magnetic layer having a thickness. The current carrier portion and yoke portion are located so that at least a portion of the current-carrier-portion surface of the yoke faces at least a portion of the current carrier portion. The magnetic layers and the set of insulating layer(s) are mechanically connected to each other in the form of a laminated stack. The laminated stack is arranged so that magnetic layers alternate with insulating layer(s). The magnetic layers are made of ferromagnetic material. The thickness of the first magnetic layer is greater than the thickness of a second magnetic layer. The second magnetic layer is more proximate to the current-carrier facing surface than the first magnetic layer.

According to a further aspect of the present invention, there is a method of making a thin film inductor. The method includes the following steps (not necessarily in the following order): (i) providing a base portion including a substrate portion and a base portion top surface; (ii) depositing a first magnetic layer on at least a portion of the base portion top surface, with the first magnetic layer including a first magnetic layer top surface; (iii) depositing a first electrically insulating layer on at least a portion of the first magnetic layer top surface, with the first electrically insulating layer including a first electrically insulating layer top surface; (iv) depositing a second magnetic layer on at least a portion of the first electrically insulating layer top surface, with the second magnetic layer including a second magnetic layer top surface; and (v) forming a current carrier portion over at least a portion of the second magnetic layer top surface. The first layer has a greater thickness than the second magnetic layer.

According to a further aspect of the present invention, there is a method of making a thin film inductor. The method includes the following steps (not necessarily in the following order): (i) providing a base portion including a current carrier portion and a base portion top surface; (ii) depositing a first magnetic layer on at least a portion of the base portion top surface, with a portion of the first magnetic layer being located over the current carrier portion, and with the first magnetic layer including a first magnetic layer top surface; (iii) depositing a first electrically insulating layer on at least a portion of the first magnetic layer top surface, with the first electrically insulating layer including a first electrically insulating layer top surface; and (iv) depositing a second magnetic layer on at least a portion of the first electrically insulating layer top surface, with the second magnetic layer including a second magnetic layer top surface. The first layer has a smaller thickness than the second magnetic layer.

DETAILED DESCRIPTION

Some embodiments of the present invention recognize the following facts, potential problems and/or potential areas for improvement with respect to the current state of the art: (i) even though magnetic layers of the thin film inductor are separated by insulating layers, there are still energy losses due to eddy currents; (ii) the magnetic layers closer to the coil (that is, the "inner layers") have larger losses than magnetic layers further from the coil; (iii) magnetic flux densities in the space occupied by inner layers are generally higher than those characterizing the outer layers due to the magnetic reluctance of the insulating layers (also called spacer layers) interposed between the winding and the outer layers; (iv) due to the relatively large magnetic flux densities, the inner layers tend to magnetically saturate at lower drive currents and have greater losses than the outer layers; and (v) in a via region, additional eddy currents are generated in the inner layers due to flux traversing perpendicular to the lamination stack.

Some embodiments of the present invention may include one, or more, of the following features, characteristics and/or advantages: (i) a laminated thin film inductor in which the individual lamina are of different thickness; (ii) thickness variations designed to provide a method of evenly distributing the eddy current losses; (iii) a thin film inductor where the inner layers, which experience higher levels of flux, are thinner than the outer layers; (iv) reduced current in relatively thin inner layers causes a more uniform current distribution when the addition of the via currents is considered; and/or (v) more uniform current distribution, due to relatively thin inner layers, results in a lower overall ohmic loss (also sometimes herein referred to as "I^2R loss").

Figure 1:
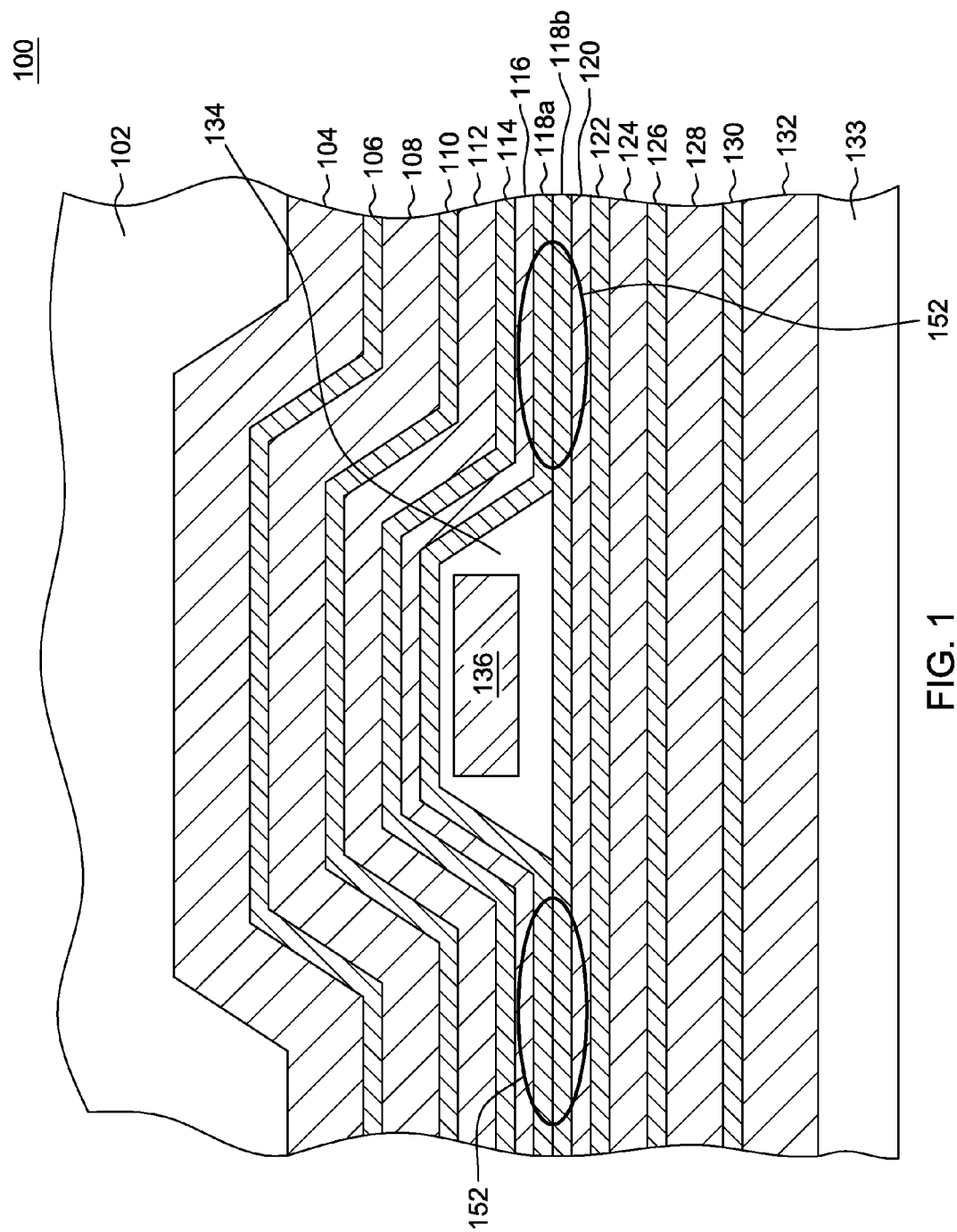
FIG. 1 is a cross-sectional view of a portion of a first embodiment of a thin film inductor assembly according to the present invention.
Figure 2:
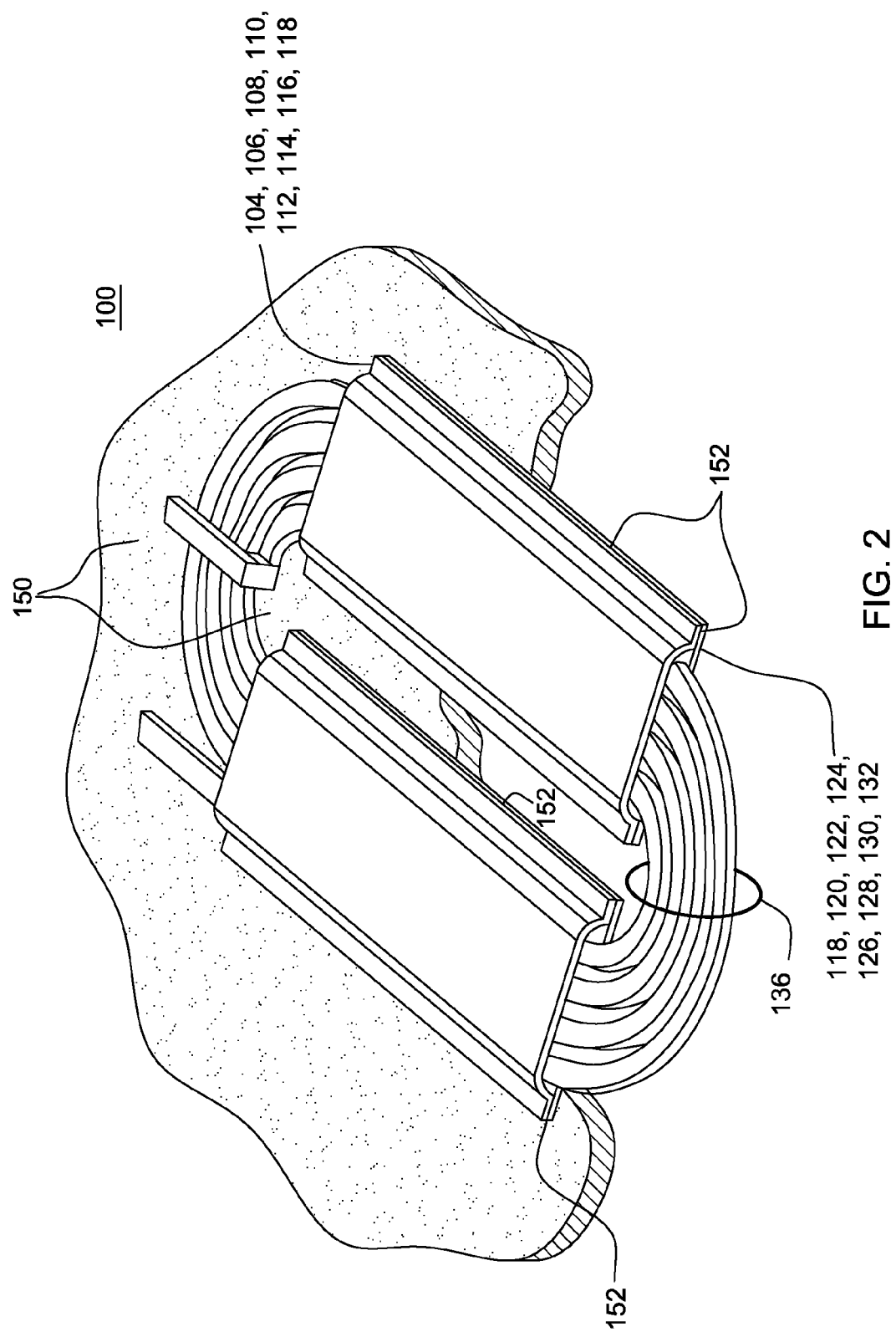
FIG. 2 is a perspective view of the first embodiment inductor.

As shown in FIGS. 1 and 2, thin film inductor 100 includes: optional insulating protection layer 102; first magnetic layer 104; first insulating layer 106; second magnetic layer 108;

second insulating layer 110; third magnetic layer 112; third insulating layer 114; fourth magnetic layer 116; fourth insulating layers 118a,b; fifth magnetic layer 120; fifth insulating layer 122; sixth magnetic layer 124; sixth insulating layer 126; seventh magnetic layer 128; seventh insulating layer 130; eighth magnetic layer 132; substrate 133; insulator 134; and winding set 136 (as shown in FIG. 2, winding set 136 has four windings in this embodiment); substrate layer 150; and magnetic via zones 152. It is noted that embodiments of the present invention may have more, or fewer, than eight (8) magnetic layers. It is also noted that FIG. 1 is not drawn to scale. Some example dimensions for the magnetic layer thicknesses will be set forth below, but the layer thickness differences have been intentionally exaggerated in the rendering of FIG. 1 in order to help communicate certain aspects of the present invention.

In inductor 100, the magnetic layers have the following thicknesses: (i) first magnetic layer 104=600 nm; (ii) second magnetic layer 108=500 nm; (iii) third magnetic layer 112=400 nm; (iv) fourth magnetic layer 116=300 nm; (v) fifth magnetic layer 120=300 nm; (vi) sixth magnetic layer 124=400 nm; (vii) seventh magnetic layer 128=500 nm; and (viii) eighth magnetic layer 132=600 nm.

The thickness values given in the previous paragraph are only an example and have not necessarily been optimized for highest performance. The optimal value will depend on many factors including the operating frequency, magnetic permeability, resistivity of the magnetic film, the total desired yoke thickness, insulating material thickness and properties, and the overall inductor and via dimensions. Optimization of this type of structure is easily carried out using finite element method (FEM) calculations as would be apparent to one skilled in the art. Likewise, choosing an optimal number of layers depends on factors such as manufacturing complexity, efficiency requirements, operating frequency, and material properties. The optimization techniques would also be apparent to one skilled in the art.

Inductor 100 has many advantages due to the above-noted differences between thicknesses of the magnetic layers: (i) the magnetic flux density is more uniform than it would be in a comparable inductor where all the magnetic layer had the same thickness; and (ii) the ohmic loss is smaller than it would be in a comparable inductor where all the magnetic layers had the same thickness.

The central insulative layers 118a and 118b will now be discussed. One or both of insulative layers 118a and 118b may be omitted. In fact, in some embodiments it may be favorable from a performance aspect to omit both insulative layers 118a and 118b so that the innermost (that is, most proximate to the current carrier) layer of the top yoke 120 and the innermost layer of the bottom yoke 122 are magnetic layers that directly contact each other. This is because: (i) these thin layers are believed to be less susceptible to eddy currents, due to their relative thinness, such that the insulative layer(s) 118 between them are not needed; and (ii) the direct contact between these magnetic layers of the top and bottom yokes will provide a lower reluctance path (that is, an improved magnetic via) between the top and bottom yokes.

The yoke in this embodiment is constructed of any soft magnetic material, such as iron alloys, nickel alloys, cobalt alloys, ferrites, etc. Typical inductors use plated materials such as permalloy or other compositions of nickel and iron, however other ferromagnetic materials and deposition techniques may be employed as would be known to someone skilled in the art. Unlike discrete inductors, the layer thickness in thin film inductors is controlled by deposition time. Variations in layer thickness can therefore typically be made at no additional cost.

The insulating layers may be made of any non-magnetic insulating material known in the art, such as aluminum oxides (for example, alumina), silicon oxides, silicon nitrides, polymers, etc. As will be appreciated by those of skill in the art, the insulating layers are usually much thinner than any of the magnetic layers.

Winding 136 is a current carrier that is configured as a spiral shape with four windings. To maximize the inductance available with this current carrier shape, two sets of top and bottom yokes (as depicted in FIG. 1) are provided. Alternatively, any type of current carrier configurations (now known or to be developed in the future) could be used in various embodiments of the present invention. For example, a straight stripline current carrier configuration, not including any return path, could be used as the current carrier. For this configuration a single set of yokes would be used, and a connection to the current carrier of the inductor would be made at either end of the structure.

Substrate layer 150 is shown in FIG. 2 as partially cut away for clarity of illustration purposes. In this embodiment, substrate layer 150 is made of silicon, and provides structural integrity and support for the other laminated components of thin film inductor 100. Alternative substrate layer 150 could be made of other materials (now known or to be developed in the future), and substrate layers of various embodiments may include multiple discrete layers, semiconductor and/or integrated circuit electrical structures or the like, as will be appreciated by those of skill in the art.

As shown in FIG. 2, magnetic via zones are formed where there is a low reluctance between the top and bottom pole pieces. In inductor 100, via zones 152 are formed where the magnetic layers of the top and bottom pole pieces are in close physical proximity. Alternatively, magnetic vias can be formed through an intermediate magnetic piece that extends from the bottom of the top pole piece to the top of the bottom pole piece.

Figure 3:
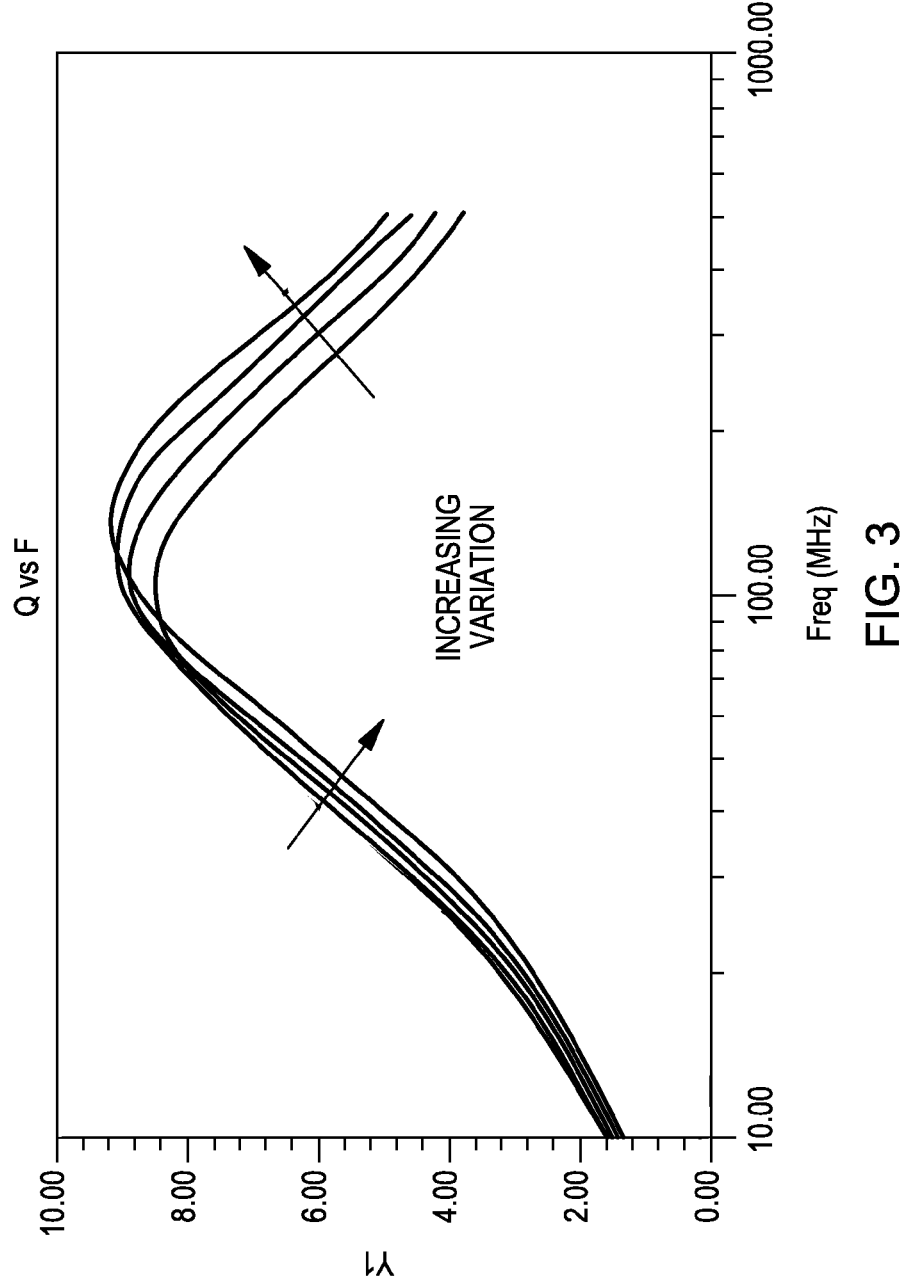
FIG. 3 is a graph illustrating certain aspects of performance achieved with an embodiment of the present invention.

The quality factor (or Q) of an inductor is the ratio of its inductive reactance to its resistance at a given frequency, and is a measure of its efficiency. Graph 200 of FIG. 3 shows the inductor Q against frequency. More specifically, each curve represents a different thickness distribution for the magnetic layers of the inductor. At the 100 megahertz (MHz) frequency, an inductor with conventional uniform thickness layers has a Q value of about 8.2, whereas the embodiment with the greatest thickness variation has a Q value of about 8.6, meaning that the increase in Q is about 5% for this "large thickness variation" embodiment. Additional gains are likely by optimizing the structure.

In some embodiments the relative thinness of the inner layers causes a reduction in overall inductance of the thin film inductor because more magnetic flux is carried through the relatively thick outer layers, which have a higher reluctance due to the laminations in the magnetic via. This reduction in L also reduces the inductor Q, because $Q=2\pi fL/R$, where f is the operating frequency, and R is a resistance representing the inductor losses. However, the reduction of the resistance loss due to the lamination thickness change more than compensates for this loss of inductance. The net result is an inductor with an overall higher Q and better performance.

One additional embodiment is an inductor with pairs of layers, both having the same thickness, but where different pairs may have a different thickness. This preserves most of the gains, but also creates pairs of layers with identical magnetic thickness that allow for flux closure in each pair of layers. For example, inductor 100 could be modified to make such an embodiment by: (i) making layers 104 and 108 have the same thickness; (ii) making layers 112 and 116 have the same thickness, which is a thickness smaller than the thickness of layers 104 and 108; (iii) making layers 120 and 124 have the same thickness; (ii) making layers 128 and 132 have the same thickness, which is a thickness larger than the thickness of layers 120 and 124.

The following paragraphs are definitions of certain terms which may be used in this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Mechanically connected: Includes both direct mechanical connections, and indirect mechanical connections made through intermediate components; includes rigid mechanical connections as well as mechanical connection that allows for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Thin film inductor: any inductor made with integrated circuit fabrication techniques; integrated circuit fabrication techniques include, but are not limited to, various types of deposition (for example, sputter deposition), various types of material removal (for example, planarization, etch processes), various types of patterning (for example, photolithography), etc.

Over/under: "Over" or "under" should not be taken to imply that a subject and object of the spatial relationship touch each other; for example, if a first layer is located over a second layer, then the first and second layers may, or may not, touch each other because there might be one or more intermediate layers between the first and second layers.

Vertical/horizontal: for purposes of convenient reference, vertical and horizontal references (or "up" and "down" or "top" and "bottom") are used herein based on a convention that the substrate underlies the yokes and current carrier, which effectively defines the "vertical" and "horizontal;" while this convenient convention is used in this document, it will be understood by those of skill in the art that the thin film inductors of the present invention, like conventional thin film inductors, may be susceptible to fabrication and/or use such that the "vertical" direction is not aligned with the direction of Earth's gravitational field.

Current-carrier-facing surface: the surface of the laminated magnetic yoke that is closest to the current carrier portion, which is to say the top surface of the bottom yoke or the bottom surface of the top yoke; the current carrier surface may be a magnetic layer or an insulative layer, but it is noted that the material that encapsulates the current carrier (for example, see insulator 134 in FIG. 1) is not considered as part of the yoke).

Base portion: any base upon which thin film inductor layers are formed, patterned and/or deposited; for example, a base portion may simply be a silicon substrate when the first layer of the bottom yoke is deposited; as a further example, the base portion may include the layers of the bottom yoke, a current carrier portion and insulator portion (for example, see insulator 134 in FIG. 1) at the time that the first layer of the top yoke portion is deposited.

What is claimed is:

1. A thin film inductor comprising:
   a current carrier portion;
   a yoke portion, which is one of the following types: a top yoke portion or a bottom yoke portion, with the yoke portion including a current-carrier-facing surface and the yoke portion comprising:
      a plurality of magnetic layers, including a first magnetic layer a second magnetic layer, and a third magnetic layer, with each magnetic layer having a thickness; and
      a set of electrically insulating layer(s) including at least a first insulating layer;
   wherein:
   the current carrier portion and yoke portion are located so that at least a portion of the current-carrier-portion surface of the yoke faces at least a portion of the current carrier portion;
   the plurality of magnetic layers and the set of insulating layer(s) are mechanically connected to each other in the form of a laminated stack;
   the laminated stack is arranged so that magnetic layers alternate with insulating layer(s);
   the magnetic layers are made of ferromagnetic material;
   the thickness of the first magnetic layer is greater than the thickness of a second magnetic layer;
   the second magnetic layer is more proximate to the current-carrier facing surface than the first magnetic layer;
   the first and third magnetic layers have no magnetic layers between them in the laminated stack; and
   the first and third magnetic layers have the same thickness.

2. The thin film inductor of claim 1 wherein:
   the plurality of magnetic layers includes a fourth magnetic layer;
   the second and fourth magnetic layers have no magnetic layers between them in the laminated stack; and
   the second and fourth magnetic layers have the same thickness.

3. The thin film inductor of claim 1 wherein:
   taken in an order from the most proximate to the current-carrier facing surface to least proximate to the current-carrier-facing surface, each magnetic layer after the most proximate magnetic layer is at least as thick as the previous magnetic layer.

4. The thin film inductor of claim 1 wherein:
   the magnetic layers are formed by an integrated circuit fabrication type deposition process.

5. The thin film inductor of claim 4 wherein the thickness of the respective thicknesses of magnetic layers of the yoke portion are controlled by their respective deposition times.

6. The thin film inductor of claim 1 wherein:
   the electrically insulating layer(s) are formed by an integrated circuit fabrication type deposition process.

7. The thin film inductor of claim 1 wherein:
   the inductor includes a top yoke portion and a bottom yoke portion; and the top yoke portion and bottom yoke portion are sized, located, structured and/or shaped so that a magnetic layer of the top yoke portion contacts a magnetic layer of the bottom yoke portion in a first magnetic via zone to form a low magnetic reluctance path between the top and bottom yoke portions.

8. A method of making a thin film inductor, the method comprising the steps of:
providing a base portion including a substrate portion and a base portion top surface;
depositing a first magnetic layer on at least a portion of the base portion top surface, with the first magnetic layer including a first magnetic layer top surface;
depositing a first electrically insulating layer on at least a portion of the first magnetic layer top surface, with the first electrically insulating layer including a first electrically insulating layer top surface;
depositing a second magnetic layer on at least a portion of the first electrically insulating layer top surface, with the second magnetic layer including a second magnetic layer top surface; and
forming a current carrier portion over at least a portion of the second magnetic layer top surface;
wherein:
the first magnetic layer has a greater thickness than the second magnetic layer; and
the first magnetic layer has a greater deposition time than the second magnetic layer.

9. The method of claim 8 wherein:
the base portion includes at least one intermediate layer between a top surface of the substrate portion and the first magnetic layer.

10. The method of claim 9 wherein the at least one intermediate layer includes at least one of the following: a magnetic layer or an electrically insulating layer.

11. A method of making a thin film inductor, the method comprising the steps of:
providing a base portion including a current carrier portion and a base portion top surface;
depositing a first magnetic layer on at least a portion of the base portion top surface, with a portion of the first magnetic layer being located over the current carrier portion, and with the first magnetic layer including a first magnetic layer top surface;
depositing a first electrically insulating layer on at least a portion of the first magnetic layer top surface, with the first electrically insulating layer including a first electrically insulating layer top surface; and
depositing a second magnetic layer on at least a portion of the first electrically insulating layer top surface, with the second magnetic layer including a second magnetic layer top surface;
wherein:
the first magnetic layer has a smaller thickness than the second magnetic layer; and
the first magnetic layer has a smaller deposition time than the second magnetic layer.

12. The method of claim 11 wherein:
the base portion includes at least one intermediate layer between a top surface of the substrate portion and the first magnetic layer; and
the at least one intermediate layer includes at least one of the following: a magnetic layer or an electrically insulating layer.

* * * * *